(12) United States Patent
Byun (10) Patent No.: US 10,970,230 B2
(45) Date of Patent: Apr. 6, 2021

(54) MEMORY SYSTEM AND OPERATING METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 20 days.

(21) Appl. No.: 16/455,901

(22) Filed: Jun. 28, 2019

(65) Prior Publication Data

US 2020/0192816 A1 Jun. 18, 2020

(30) Foreign Application Priority Data

Dec. 14, 2018 (KR) .......................... 10-2018-0162363

(51) Int. Cl.
*G06F 12/02* (2006.01)
*G06F 12/0873* (2016.01)
*G06F 3/06* (2006.01)
*G06F 12/1027* (2016.01)

(52) U.S. Cl.
CPC .......... *G06F 12/1027* (2013.01); *G06F 3/064* (2013.01); *G06F 3/0658* (2013.01); *G06F 12/0246* (2013.01); *G06F 12/0873* (2013.01); *G06F 3/0607* (2013.01); *G06F 3/0679* (2013.01)

(58) Field of Classification Search
CPC . G06F 3/06; G06F 12/10; G06F 12/02; G06F 12/08
USPC ....................................................... 711/154
See application file for complete search history.

(56) References Cited

U.S. PATENT DOCUMENTS 10,001,924 B2 * 6/2018 Sharma ................ G06F 3/0679

FOREIGN PATENT DOCUMENTS

KR    10-2017-0081126    7/2017
KR    10-2018-0016679    2/2018

* cited by examiner

*Primary Examiner* — Christopher B Shin
(74) *Attorney, Agent, or Firm* — IP & T Group LLP (57) ABSTRACT

There are provided a memory system and an operating method thereof. The memory system includes: a host for receiving and storing a host map segment; a memory device including a system block for storing map data, the memory device performing overall operations in response to an internal command; and a controller for generating the internal command for controlling the memory device in response to a host command received from the host. The controller receives the map data from the memory device and then stores the received map data, and generates the host map segment, using the map data, and then transmits the generated host map segment. A number of generatable host map segments is adjusted based on a work load calculated in a setting period.

20 Claims, 9 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0162363, filed on Dec. 14, 2018, the entire disclosure of which is herein incorporated by reference in its entirety.

BACKGROUND

Field of Invention

The present disclosure generally relates to an electronic device, and more particularly, to a memory system and an operating method thereof.

Description of Related Art

The paradigm on recent computer environment has turned into ubiquitous computing environment in which computing systems can be used anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

A data storage device using a memory device has excellent stability and durability, high information access speed, and low power consumption, since there is no mechanical driving part. In an example of memory systems having such advantages, the data storage device includes a Universal Serial Bus (USB) memory device, memory cards having various interfaces, a Solid State Drive (SSD), and the like.

The memory device is generally classified into a volatile memory device and a nonvolatile memory device.

The nonvolatile memory device has relatively slow write and read speeds, but retains stored data even when the supply of power is interrupted. Thus, the nonvolatile memory device is used to store data to be retained regardless of whether power is supplied.

Examples of the volatile memory include a Read Only Memory (ROM), a Mask ROM (MROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The flash memory is classified into a NOR type flash memory and a NAND type flash memory.

SUMMARY

Embodiments provide a memory system capable of efficiently generating a host map segment to be stored in a host memory using map data stored in a controller, and an operating method of the memory system.

According to an aspect of the present disclosure, there is provided a memory system including: a host configured to receive and store a host map segment; a memory device including a system block for storing map data, the memory device performing overall operations in response to an internal command; and a controller configured to generate the internal command for controlling the memory device in response to a host command received from the host, wherein the controller receives the map data from the memory device and then stores the received map data, and generates the host map segment, using the map data, and then transmits the generated host map segment, wherein a number of generatable host map segments is adjusted based on a work load calculated in a setting period.

According to another aspect of the present disclosure, there is provided a memory system including: a memory device including a system block for storing map data and a host map segment; and a controller configured to control overall operations of the memory device, receive and store some map data among the map data stored in the system block, and generate the host map segment, based on the map data or the some map data, wherein the controller adjusts a number of generatable host map segments, based on a work load calculated in a setting period.

According to still another aspect of the present disclosure, there is provided a method for operating a memory system, the method including: calculating a work load of the memory system; generating a host map segment, based on map data stored in a memory device or a controller, wherein a number of generatable host map segments is adjusted based on the calculated work load; and outputting the generated host map segment to a host.

According to another aspect of the present disclosure, there is provided a memory system including: a host that stores one or more host map segments including one or more pieces of map data representing mapping relationship between logical addresses and physical addresses; a memory device that stores user data and plural pieces of map data; and a controller that generates the host map segments based on the plural pieces of map data to provide the generated host map segments to the host depending on a workload of the memory device and the controller, wherein the host provides the controller with a request along with logical and physical addresses mapped to each other within the host map segments, and wherein the controller controls, in response to the request, the memory device to access the user data according to the physical address provided from the host.

BRIEF DESCRIPTION OF THE DRAWINGS

Various embodiments will now be described more fully with reference to the accompanying drawings; however, the present invention may be embodied in different forms and thus should not be construed as limited to the embodiments set forth herein. Rather, these embodiments are provided so that this disclosure is thorough and complete and fully conveys the scope of the embodiments to those skilled in the art. Also, throughout the specification, reference to "an embodiment," "another embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional description provided herein is for the purpose of describing embodiments of the present disclosure. The embodiments, however, can be implemented in various forms, which may be modifications or variations of any of the disclosed embodiments. Thus, the present invention is not limited to the embodiments set forth herein.

Moreover, while the disclosed embodiments are described in detail, the present invention is not limited to specific details. Rather, the present invention includes all changes, equivalents, or substitutes that do not depart from the spirit and technical scope of the present disclosure.

While terms such as "first" and "second" may be used to identify various components, such components must not be understood as being limited by the above terms. The above terms are used only to distinguish one component from another that otherwise have the same or similar names. For example, a first component in one instance may be referred to as a second component in another instance without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form. It will be further understood that terms such as "including" or "having," etc., are intended to indicate the existence of the stated features, numbers, operations, actions, components, parts, or combinations thereof, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. Ordinary dictionary-defined terms should be understood such that they have meanings consistent with the context of the related technique. So far as not being clearly defined in this application, terms should not be understood in an ideally or excessively formal way.

Description of techniques that are well known to the art to which the present disclosure pertains and not directly related to the present disclosure is omitted so as not to unnecessarily obscure features and aspects of the present invention.

Various embodiments of the present disclosure are described below in detail with reference to the accompanying drawings in order for those skilled in the art to be able to readily implement and practice the present invention.

Figure 1:
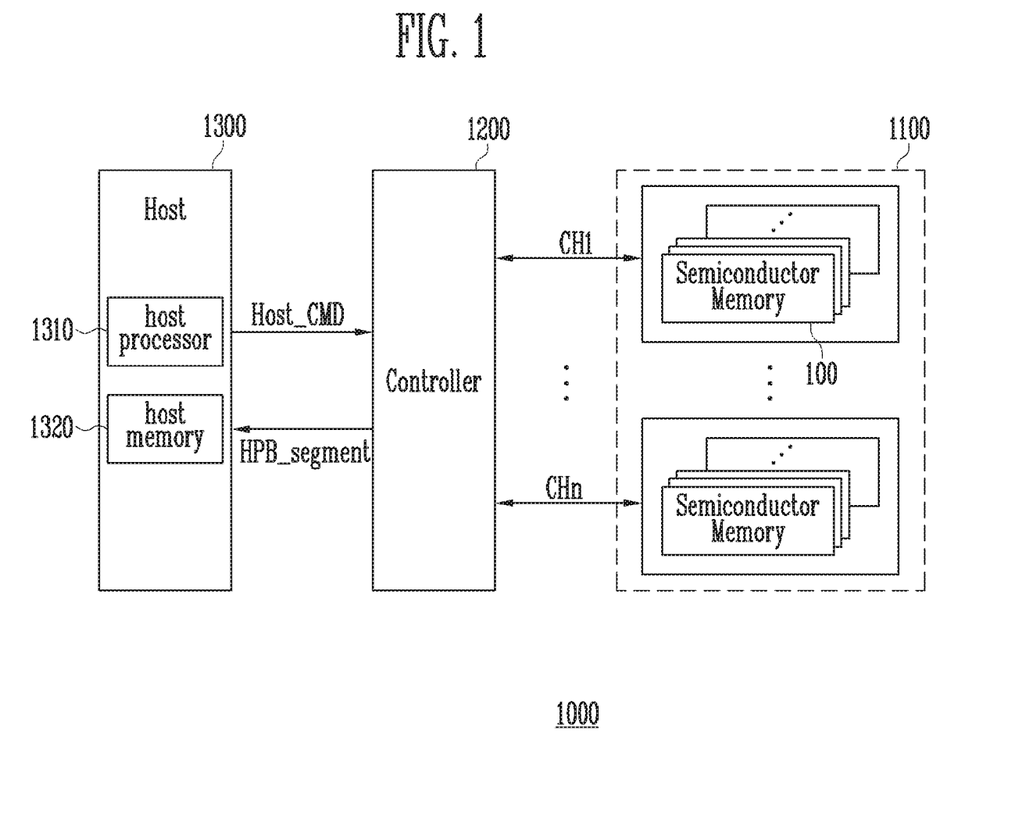
FIG. 1 is a block diagram illustrating a memory system according to an embodiment of the present disclosure.

FIG. 1 is a block diagram illustrating a memory system 1000 according to an embodiment of the present disclosure.

Referring to FIG. 1, the memory system 1000 includes a memory device 1100, a controller 1200, and a host 1300. The memory device 1100 includes a plurality of semiconductor memories 100. The plurality of semiconductor memories 100 may be divided into a plurality of groups. Although an arrangement in which the host 1300 is included in the memory system 1000 is illustrated in FIG. 1, the present invention is not limited to that arrangement. In another embodiment, the memory system 1000 may include only the controller 1200 and the memory device 1100, and the host 1300 may be disposed externally to the memory system 1000.

FIG. 1 illustrates that the plurality of groups of the memory device 1100 communicate with the controller 1200 respectively through first to nth channels CH1 to CHn. At least one semiconductor memory 100 among the plurality of semiconductor memories 100 may include a system block, and the system block may store map data for mapping a logical address received from the host 1300 to a physical address of the memory device 1100. In addition, the system block may receive and store a host map segment HPB_segment generated in the controller 1200.

Each semiconductor memory 100 will be described later with reference to FIG. 4.

Each of the plurality of semiconductor memories 100 in a given group communicates with the controller 1200 through one common channel. That is, a first group communicates with the controller 1200 through a first channel CH1, and an nth group communicates with the controller 1200 through an nth channel CHn. The controller 1200 controls the plurality of semiconductor memories 100 of the memory device 1100 through the plurality of channels CH1 to CHn.

The controller 1200 is coupled between the host 1300 and the memory device 1100. The controller 1200 accesses the memory device 1100 in response to a request from the host 1300. For example, the controller 1200 controls read, write, erase, and background operations of the memory device 1100 in response to a host command Host_CMD received from the host 1300. In the write operation, the host 1300 may transmit data and an address together with the host command Host_CMD. In the read operation, the host 1300 may transmit an address together with the host command Host_CMD. In a power-on operation of the memory system 1000, the controller 1200 may receive a portion of map data stored in the memory device 1100 and stores the received map data therein. The controller 1200 performs a mapping operation of mapping an address (logical address) received from the host 1300 to an address (physical address) of the memory device 1100. Also, the controller 1200 may generate a portion of the map data stored therein as a host map segment HPB_segment, and transmit the generated host map segment HPB_segment to the host 1300. Also, the controller 1200 may store the generated host map segment HPB_segment therein, or store the host map segment HPB_segment in the memory device 1100 by transmitting the host map segment HPB_segment to the memory device 1100.

The controller 1200 may adjust a number of host map segments that are generated based on a work load of the memory system when the controller 1200 generates the host map segments HPB_segment. For example, the memory system 1000 may decrease the number of host map segments that are generated when the work load of the memory system 1000 increases, and increase the number of host map segments that are generated when the work load of the memory system 1000 decreases.

The controller 1200 provides an interface between the memory device 1100 and the host 1300. The controller 1200 drives firmware for controlling the memory device 1100.

The host 1300 may include a host processor 1310 and a host memory 1320. The host processor 1310 may generate at least one host command Host_CMD corresponding to a user request, and transmit the generated host command Host_CMD to the controller 1200. The host memory 1320 may store the host map segment HPB_segment received from the controller 1200.

The host 1300 includes any of a variety of portable electronic devices, such as a computer, a PDA, a PMP, an MP3 player, a camera, a camcorder, and a mobile phone. The host 1400 may request a write operation, a read operation, an erase operation, etc. of the memory system 1000 through a host command Host_CMD. In order to perform a write operation of the memory device 1100, the host 1300 may transmit, to the controller 1200, a host command Host_CMD, data, and an address, which correspond to a write command. In order to perform a read operation of the memory device 1100, the host 1300 may transmit, the controller 1200, a host command Host_CMD and an address, which correspond to a read command.

The controller 1200 and the memory device 1100 may be integrated into one semiconductor device. In an embodiment, the controller 1200 and the memory device 1100 may be integrated into one semiconductor device to constitute a memory card, such as a PC card (Personal Computer Memory Card International Association (PCMCIA)), a Compact Flash (CF) card, a Smart Media Card (SM or SMC), a memory stick, a Multi-Media Card (MMC, RS-MMC or MMCmicro), an SD card (SD, miniSD, microSD or SDHC), or a Universal Flash Storage (UFS).

The controller 1200 and the memory device 1100 may be integrated into one semiconductor device to constitute a semiconductor drive (Solid State Drive (SSD)). The semiconductor drive SSD includes a storage device configured to store data in a semiconductor memory.

In another example, the memory system 1000 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multi-Media Player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an embodiment, the memory device 1100 or the memory system 1000 may be packaged in various forms. For example, the memory device 1100 or the memory system 1000 may be packaged in a manner such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), Plastic Metric Quad Flat Pack (PMQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi-Chip Package (MCP), Wafer-level Fabricated Package (WFP), or Wafer-level processed Stack Package (WSP).

Figure 2:
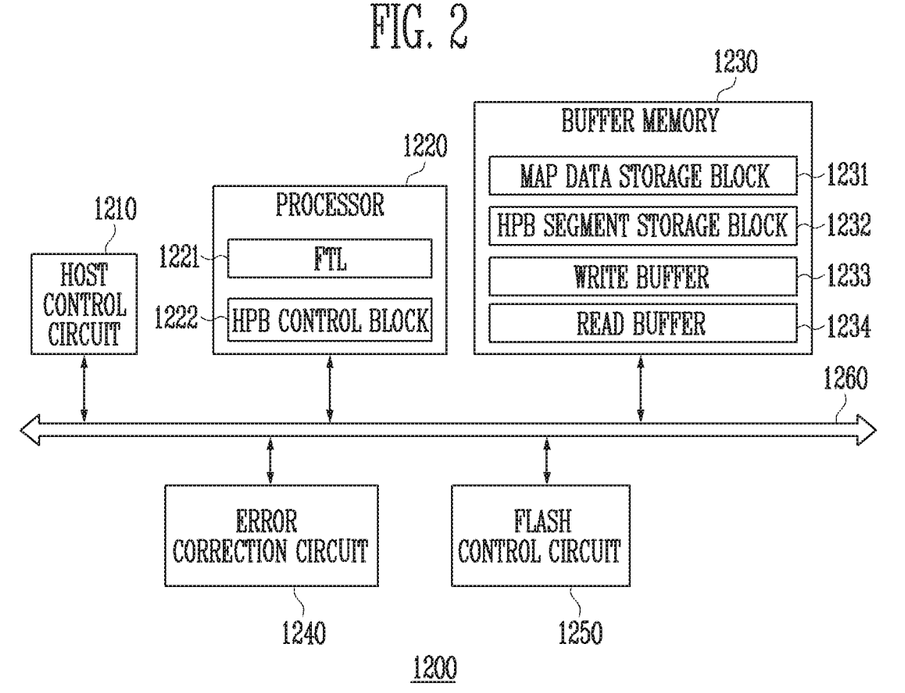
FIG. 2 is a block diagram illustrating a configuration of a controller, such as that shown in FIG. 1.

FIG. 2 is a block diagram illustrating a configuration of the controller shown in FIG. 1.

Referring to FIG. 2, the controller 1200 may include a host control circuit 1210, a processor 1220, a buffer memory 1230, an Error Correction Code (ECC) circuit 1240, a flash control circuit 1250, and a bus 1260.

The bus 1260 may provide a channel between components of the controller 1200.

The host control circuit 1210 may control data transmission between the host 1300 shown in FIG. 1 and the buffer memory 1230. In an example, the host control circuit 1210 may control an operation of buffering data input from the host 1300 to the buffer memory 1230. In another example, the host control circuit 1210 may control an operation of outputting the data buffered to the buffer memory 1230 to the host 1300. Also, the host control circuit 1210 may transmit a host map segment stored in the buffer memory 1230 to the host 1300.

The host control circuit 1210 may include a host interface.

The processor 1220 may control the overall operations of the controller 1200, and perform a logical operation. The processor 1220 may communicate with the host 1300 shown in FIG. 1 through the host control circuit 1210, and communicate with the memory device 1100 shown in FIG. 1 through the flash control circuit 1250. Also, the processor 1220 may control an operation of the memory system 1000 by using the buffer memory 1230 as a working memory, cache memory or buffer memory. The processor 1220 may control the flash control circuit 1250 in response to a command queue generated by realigning a plurality of host commands received from the host 1300 according to an order of priority. Also, the processor 1220 generates a host map segment, using selected map data among map data stored in the buffer memory 1230 or map data stored in the memory device 1100. Also, the processor 1220 adjusts or controls a number of host map segments that are generated based on a work load of the memory system 1000 in an operation of generating the host map segment(s).

The processor 1220 may include a Flash Translation Layer (FTL) 1221 and a Host-aware Performance Booster (HPB) control block 1222.

The FTL 1221 controls overall operations of the memory system by driving firmware. The firmware may be stored in a memory (not shown) directly coupled to the processor 1220, be stored in the buffer memory 1230, or be stored in the processor 1220. In a write operation, the FTL 1221 may map a corresponding physical address to an address (e.g., a logical address) input from the host 1300 shown in FIG. 1. Also, in a read operation, the FTL 1221 checks the physical address mapped to the logical address input from the host 1300. The mapping operation is performed based on map data stored in the buffer memory 1230. On the other hand, when a logical address corresponding to a host map segment stored in the host 1300 is received from the host 1300, an address corresponding to the memory device 1100 may also be received together with the logical address from the host 1300. In this case, the mapping operation is not performed.

Also, the FTL 1221 may generate a command queue for controlling the flash control circuit 1250 in response to a host command received from the host 1300.

The HPB control block 1222 generates a host map segment, using selected map data among map data stored in the buffer memory 1230 or map data stored in the memory device 1100. Also, the HPB control block 1222 calculates a work load value by predicting a work load of the memory system 1000, and adjusts or controls a number of host map segments that are generated based on the calculated work load value.

Once generated, a host map segment may be stored in the buffer memory 1230, the memory device 1100, or both. The stored host map segment is transmitted to the host 1300 to be stored in the host 1300.

Although an arrangement in which the FTL 1221 and the HPB control block 1222 are individually provided is illustrated FIG. 2, the HPB control block 1222 may be included in the FTL 1221.

The buffer memory 1230 may be used as a working memory, cache memory or data buffer memory of the processor 1220. The buffer memory 1230 may store codes and commands, which are executed by the processor 1220. The buffer memory 1230 may store data processed by the processor 1220. Also, the buffer memory 1230 may store map data for a mapping operation performed by the processor 1220. The map data may be stored in the memory device 1100 shown in FIG. 1. The map data may be read in a power-on operation of the memory system 1000 to be stored in the buffer memory 1230.

The buffer memory 1230 may include a map data storage block 1231, an HPB segment storage block 1232, a write buffer 1233, and a read buffer 1234. The map data storage block 1231 may receive and store map data read from the memory device 1100 in the power-on operation of the memory system 1000. The HPB segment storage block 1232 may store a host map segment generated by the HPB control block 1222. The write buffer 1233 temporarily stores data, which is received together with a write command from the host 1300, and then transmits the temporarily stored data to the memory device 1100 when the write command is transmitted to the memory device 1100. The read buffer 1234 temporarily stores data received from the memory device 1100 in a read operation and then transmits such data to the host 1300.

The buffer memory 1230 may include a Static RAM (SRAM) or Dynamic RAM (DRAM).

The ECC circuit 1240 may perform an ECC operation. The ECC circuit 1240 may perform ECC encoding based on data to be written to the memory device 1100 shown in FIG. 1 through the flash control circuit 1250. The ECC-encoded data may be transferred to the memory device 1100 through the flash control circuit 1250. The ECC circuit 1240 may perform ECC decoding on data received from the memory device 1100 through the flash control circuit 1250. In an example, the ECC circuit 1240 may be included as a component of the flash control circuit 1250 in the flash control circuit 1250.

The flash control circuit 1250 generates and outputs an internal command for controlling the memory device 1100 in response to the command queue generated by the processor 1220. In a write operation, the flash control circuit 1250 may control the write operation by transmitting data buffered to the write buffer 1233 of the buffer memory 1230 to the memory device 1100. In another example, in a read operation, the flash control circuit 1250 may control an operation of buffering data read from the memory device 1100 to the read buffer 1234 of the buffer memory 1230 in response to a command queue. Also, in a map data update operation, the flash control circuit 1250 may control the memory device 1100 to read map data stored in the memory device 1100 and store the read map data in the map data storage block 1231 of the buffer memory 1230.

The flash control circuit 1250 may include a flash interface.

Figure 3:
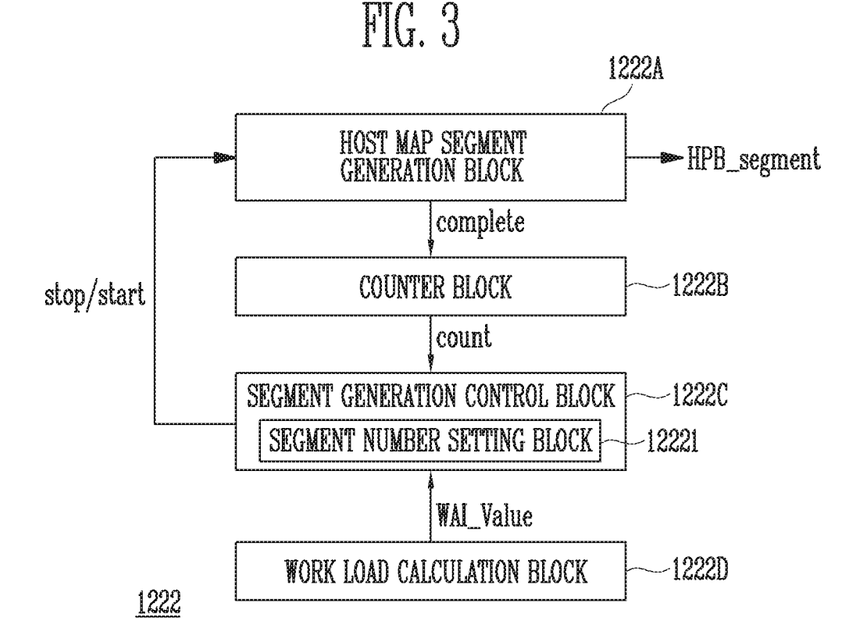
FIG. 3 is a block diagram illustrating an HPB control block, such as that shown in FIG. 2.

FIG. 3 is a block diagram illustrating an HPB control block, e.g., HPB control block 1222 shown in FIG. 2.

Referring to FIG. 3, the HPB control block 1222 may include a host map segment generation block 1222A, a counter block 1222B, a segment generation control block 1222C, and a work load calculation block 1222D.

The host map segment generation block 1222A generates a host map segment HPB_segment based on map data, in response to a start signal Start. For example, the host map segment generation block 1222A selects and receives some map data among map data stored in the map data storage block 1231 shown in FIG. 2 or the memory device 1100 shown in FIG. 1, and generates a host map segment HPB_segment based on the received map data. For example, the host map segment generation block 1222A may generate plural pieces of map data respectively corresponding to adjacent addresses as one host map segment HPB_segment. Also, the host map segment generation block 1222A stops generating the host map segment HPB_segment in response to a stop signal Stop.

The counter block 1222B receives a generation completion signal Complete whenever one host map segment HPB_segment is completely generated by the host map segment generation block 1222A, and manages a number of generated host map segments HPB_segment by increasing the number of generated host map segments HPB_segment by 1 whenever the generation completion signal Complete is received. Also, the counter block 1222B manages the number of generated host map segments HPB_segment by subtracting a number of host map segments HPB_segment transmitted to the host 1300 shown in FIG. 1 from the number of generated host map segments HPB_segment.

The segment generation control block 1222C may generate and output a start signal Start or stop signal Stop for performing or stopping the operation of generating the host map segment HPB_segment in the host map segment generation block 1222A based on a work load value WAI_Value.

The segment generation control block 1222C may include a segment number setting block 12221. The segment number setting block 12221 sets a generatable number of host map segments (generatable number) based on the work load value WAI_Value. For example, the generatable number of host map segments may be set and subsequently adjusted in inverse proportion to the work load value. The segment number setting block 12221 generates and outputs the start signal Start or the stop signal Stop by comparing the set generatable number with a Count, which is indicative of the number of generated host map segments HPB_segment, and which is managed by the counter block 1222B. For example, when it is determined that the Count is greater than or equal to the set generatable number, the segment number setting block 12221 generates and outputs the stop signal Stop. When it is determined that the Count is less than the set generatable number, the segment number setting block 12221 generates and outputs the start signal Start.

The work load calculation block 1222D generates and outputs the work load value WAI_Value by calculating a work load of the memory system during a setting period in which an operation of generating the host map segment HPB_segment and an operation of transmitting the generated host map segment HPB_segment to the host and the memory device are performed. For example, the work load calculation block 1222D calculates a work load value by predicting an operation of generating a host map segment, a write, read or erase operation of the memory system and an operation of storing the host map segment in the memory device 1100, which are to be performed in the setting period.

Figure 4:
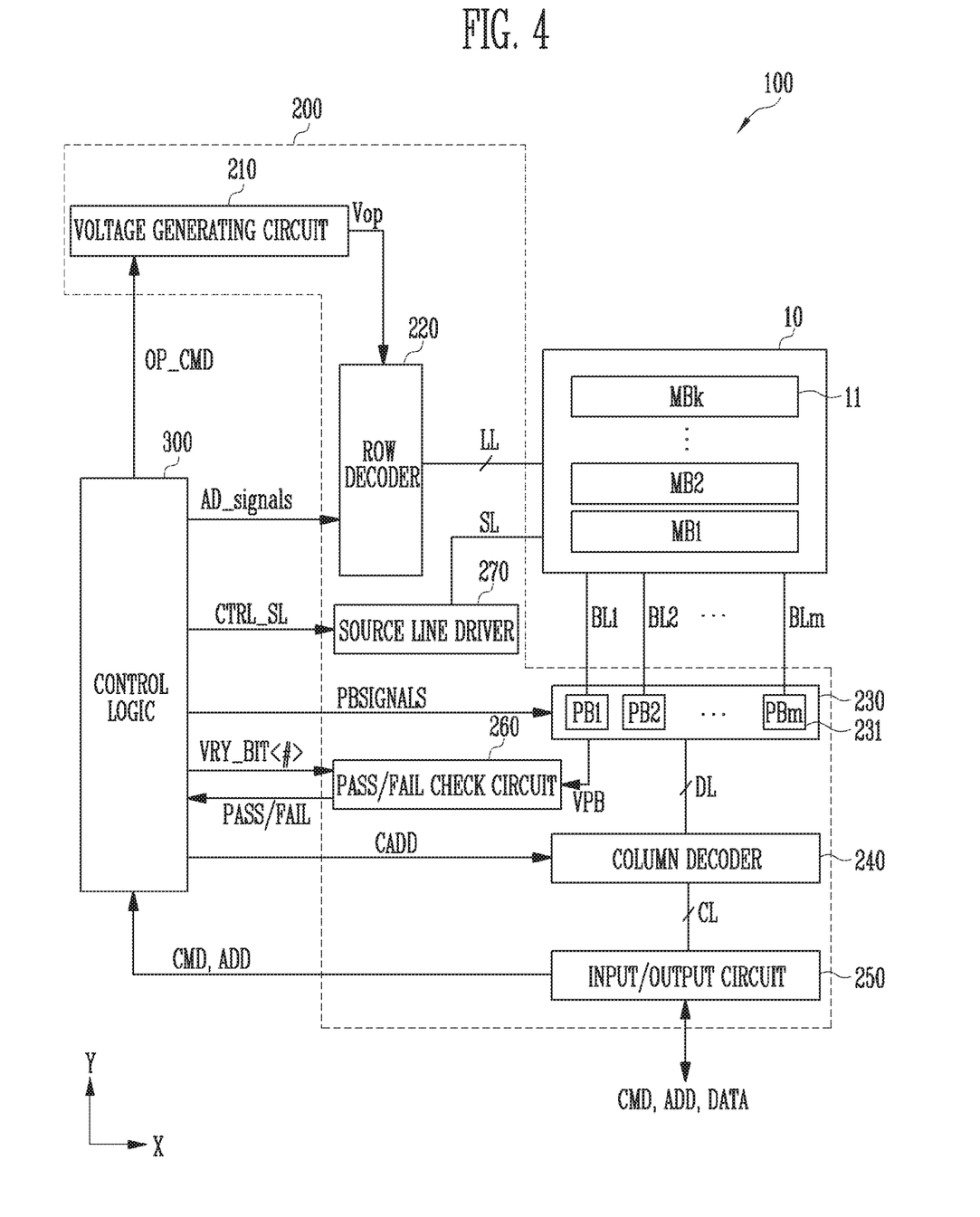
FIG. 4 is a diagram illustrating a semiconductor memory, such as that shown in FIG. 1.

FIG. 4 is a diagram illustrating an example of the semiconductor memory 100 shown in FIG. 1.

Referring to FIG. 4, the semiconductor memory 100 may include a memory cell array 10 that stores data. The semiconductor memory 100 may include a peripheral circuit 200 configured to perform a program operation for storing data in the memory cell array 10, a read operation for outputting the stored data, and an erase operation for erasing the stored data. The semiconductor memory 100 may include control logic 300 that controls the peripheral circuit 200 under the control of the controller 1200 shown in FIG. 1.

The memory cell array 10 may include a plurality of memory blocks MB1 to MBk (k is a positive integer) 11. Local lines LL and bit lines BL1 to BLm (m is a positive integer) may be coupled to the memory blocks MB1 to MBk 11. For example, the local lines LL may include a first select line, a second select line, and a plurality of word lines arranged between the first and second select lines. Also, the local lines LL may further include dummy lines arranged between the first select line and the word lines and between the second select line and the word lines. The first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks MB1 to MBk 11, respectively, and the bit lines BL1 to BLm may be commonly coupled to the memory blocks MB1 to MBk 11. The memory blocks MB1 to MBk 11 may be implemented in a two-dimensional or three-dimensional structure. For example, memory cells may be arranged in a direction parallel to a substrate in memory blocks 11 having a two-dimensional structure. For example, memory cells may be arranged in a direction vertical to a substrate in memory blocks 11 having a three-dimensional structure.

At least one memory block (e.g., MB1) among the plurality of memory blocks MB1 to MBk 11 may be defined as a system memory block, and map data and a host map segment HPB_segment generated in the host map segment generation block 1222A shown in FIG. 3 may be stored in the system memory block.

The peripheral circuit 200 may be configured to perform program, read, and erase operations of a selected memory block 11 under the control of the control logic 300. For example, the peripheral circuit 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, a pass voltage, and a select transistor operation voltage under the control of the control logic 300.

The row decoder 220 may transfer the operating voltages Vop to local lines LL coupled to the selected memory block 11 in response to control signals AD_signals. For example, the row decoder 220 may selectively apply operation voltages (e.g., a program voltage, a verify voltage, a pass voltage, and the like) generated by the voltage generating circuit 210 to word lines among the local lines LL in response to the control signals AD_signals.

In a program voltage applying operation, the row decoder 220 applies a program voltage generated by the voltage generating circuit 210 to a selected word line among the local lines LL in response to the control signals AD_signals, and applies a pass voltage generated by the voltage generating circuit 210 to the other unselected word lines. Also, in a read operation, the row decoder 220 applies a read voltage generated by the voltage generating circuit 210 to a selected word line among the local lines LL in response to the control signals AD_signals, and applies a pass voltage generated by the voltage generating circuit 210 to the other unselected word lines.

The page buffer group 230 may include a plurality of page buffers PB1 to PBm 231 coupled to the bit lines BL1 to BLm. The page buffers PB1 to PBm 231 may operate in response to page buffer control signals PBSIGNALS. For example, the page buffers PB1 to PBm 231 may temporarily store data to be programmed in a program operation, or sense voltages or currents of the bit lines BL1 to BLm in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are received from the controller 1200 shown in FIG. 1, to the control logic 300, or exchange data DATA with the column decoder 240.

In a read operation and a verify operation, the pass/fail check circuit 260 may generate a reference current in response to an allow bit VRY_BIT<#>, and output a pass signal PASS or a fail signal FAIL by comparing a sensing voltage VPB received from the page buffer group 230 with a reference voltage generated by the reference current.

The source line driver 270 may be coupled to a memory cell included in the memory cell array 10 through a source line SL, and control a voltage applied to the source line SL. The source line driver 270 may receive a source line control signal CTRL_SL from the control logic 300, and control a source line voltage applied to the source line SL, based on the source line control signal CTRL_SL.

The control logic 300 may control the peripheral circuit 200 by outputting the operation signal OP_CMD, the control signals AD_signals, the page buffer control signals PBSIG-NALS, and the allow bit VRY_BIT<#> in response to the command CMD and the address ADD. Also, the control logic 300 may determine whether the verify operation has passed or failed in response to the pass or fail signal PASS or FAIL.

Figure 5:
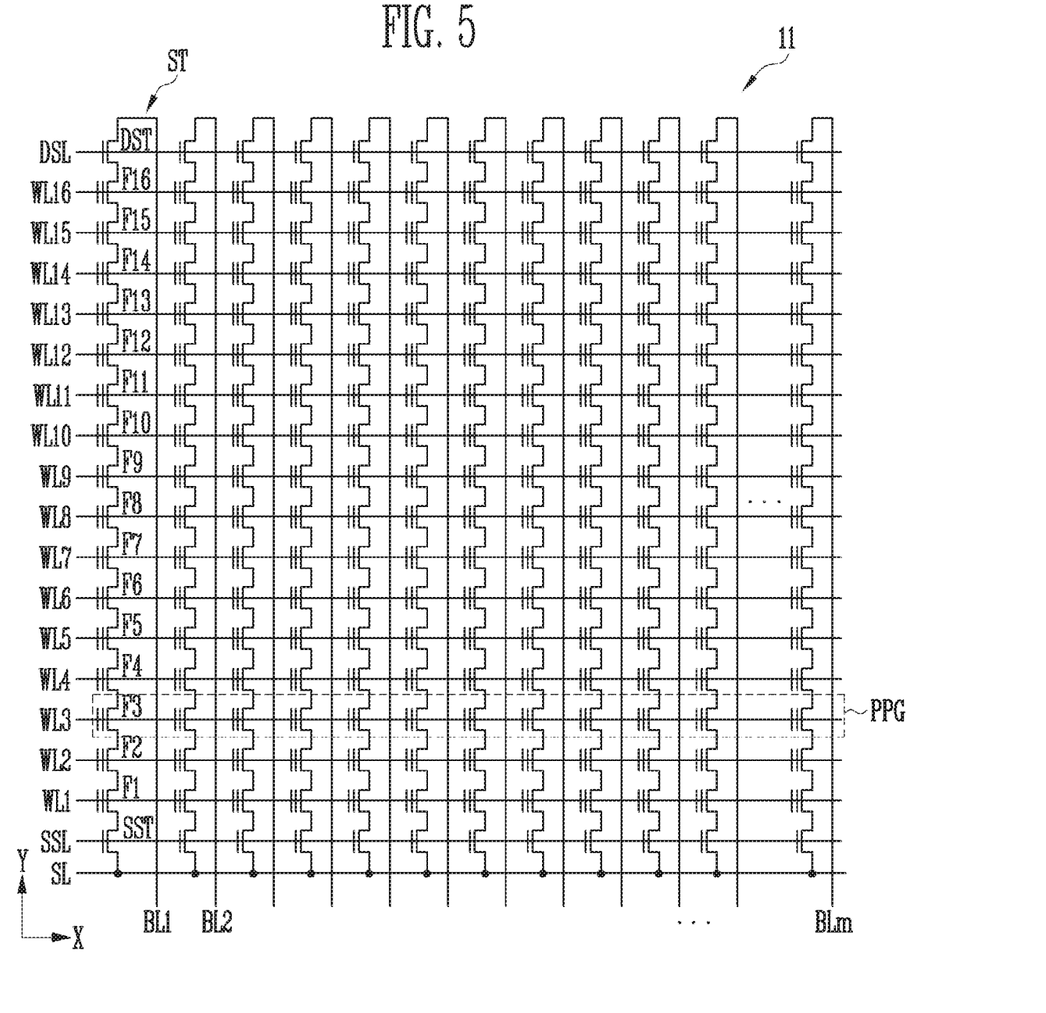
FIG. 5 is a diagram illustrating a memory block, such as that shown in FIG. 4.

FIG. 5 is a diagram illustrating a structure of the memory block shown in FIG. 4 in accordance with an embodiment.

Referring to FIG. 5, in the memory block 11, a plurality of word lines arranged in parallel to one another may be coupled between a first select line and a second select line. The first select line may be a source select line SSL, and the second select line may be a drain select line DSL. More specifically, the memory block 11 may include a plurality of strings ST coupled between bit lines BL1 to BLm and a source line SL. The bit lines BL1 to BLm may be coupled to the strings ST, respectively, and the source line SL may be commonly coupled to the strings ST. The strings ST may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and more than the 16 memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings ST may be coupled to the source select line SSL, gates of drain select transistors DST included in different strings ST may be coupled to the drain select line DSL, gates of the memory cells F1 to F16 included in different strings ST may be coupled to a plurality of word lines WL1 to WL16. A group of memory cells coupled to the same word line among the memory cells included in different strings ST may be a physical page PPG. Therefore, physical pages PPG of which number corresponds to that of the word lines WL1 to WL16 may be included in the memory block 110.

One memory cell may store data of one bit. The one memory cell is generally referred to as a single level cell (SLC). One physical page PPG may store one logical page (LPG) data. The one LPG data may include data bits corresponding to the number of cells included in one physical page PPG. Also, one memory cell may store data of two or more bits. The one memory cell is generally referred to as a multi-level cell (MLC). One physical page PPG may store two or more LPG data.

Figure 6:
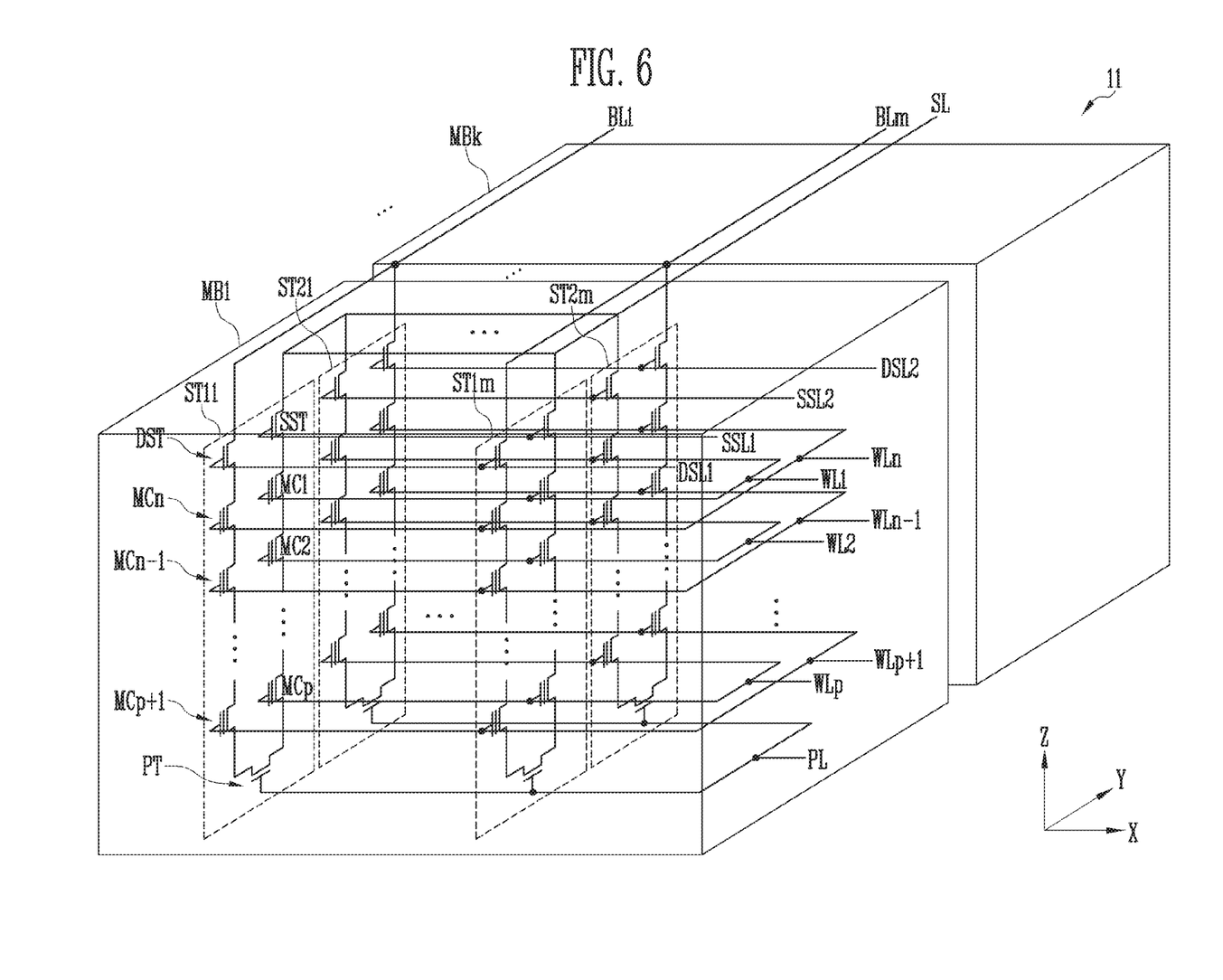
FIG. 6 is a diagram illustrating an embodiment of a three-dimensionally configured memory block.

FIG. 6 is a diagram illustrating an embodiment of a three-dimensionally configured memory block.

Referring to FIG. 6, the memory cell array 10 may include a plurality of memory blocks MB1 to MBk 11. The memory block 11 may include a plurality of strings ST11 to ST1m and ST21 to ST2m. In an embodiment, each of the plurality of strings ST11 to ST1m and ST21 to ST2m may be formed in a 'U' shape. In the memory block 11, m strings may be arranged in a row direction (X direction). Although an arrangement in which two strings are arranged in a column direction (Y direction) is illustrated in FIG. 6, this is for clarity; three or more strings may be arranged in the column direction (Y direction).

Each of the plurality of strings ST11 to ST1m and ST21 to ST2m may include at least one source select transistor SST, first to nth memory cells MC1 to MCn, a pipe transistor PT, and at least one drain select transistor DST.

The source and drain select transistors SST and DST and the memory cells MC1 to MCn may have structures similar to one another. For example, each of the source and drain select transistors SST and DST and the memory cells MC1 to MCn may include a channel layer, a tunnel insulating layer, a charge trapping layer, and a blocking insulating layer. For example, a pillar for providing the channel layer may be provided in each string. For example, a pillar for providing at least one of the channel layer, the tunnel insulating layer, the charge trapping layer, and the blocking insulating layer may be provided in each string.

The source select transistor SST of each string may be coupled between a source line SL and memory cells MC1 to MCp.

In an embodiment, source select transistors of strings arranged in the same row may be coupled to a source select line extending in the row direction, and source select transistors of strings arranged in different rows may be coupled to different source select lines. In FIG. 6, source select transistors of strings ST11 to ST1m of a first row may be coupled to a first source select line SSL1. Source select transistors of strings ST21 to ST2m of a second row may be coupled to a second source select line SSL2.

In another embodiment, the source select transistors of the strings ST11 to ST1m and ST21 to ST2m may be commonly coupled to one source select line.

First to nth memory cells MC1 to MCn of each string may be coupled between the source select transistor SST and the drain select transistor DST.

The first to nth memory cells MC1 to MCn may be divided into first to pth memory cells MC1 to MCp and (p+1)th to nth memory cells MCp+1 to MCn. The first to pth memory cells MC1 to MCp may be sequentially arranged in a vertical direction (Z direction), and be coupled in series to each other between the source select transistor SST and the pipe transistor PT. The (p+1)th to nth memory cells MCp+1 to MCn may be sequentially arranged in the vertical direction (Z direction), and be coupled in series to each other between the pipe transistor PT and the drain select transistor DST. The first to pth memory cells MC1 to MCp and the (p+1)th to nth memory cells MCp+1 to MCn may be coupled to each other through the pipe transistor PT. Gates of the first to nth memory cells MC1 to MCn of each string may be coupled to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. A gate of the pipe transistor PT of each string may be coupled to a pipe line PL.

The drain select transistor DST of each string may be coupled to a bit line and the memory cells MCp+1 to MCn. Strings arranged in the row direction may be coupled to a drain select line extending in the row direction. Drain select transistors of the strings ST11 to ST1m of the first row may be coupled to a first drain select line DSL1. Drain select transistors of the strings ST21 to ST2m of the second row may be coupled to a second drain select line DSL2.

Strings arranged in the column direction may be coupled to bit lines extending in the column direction. In FIG. 6, strings ST11 and ST21 of a first column may be coupled to a first bit line BL1. Strings ST1m and ST2m of an mth column may be coupled to an mth bit line BLm.

Memory cells coupled to the same word line among the strings arranged in the row direction may constitute one page. For example, memory cells coupled to the first word line WL1 among the strings ST11 to ST1m of the first row may constitute one page. Memory cells coupled to the first word line WL1 among the strings ST21 to ST2m of the second row may constitute another page. When any one of the drain select lines DSL1 and DSL2 is selected, strings arranged in one row direction may be selected. When any one of the word lines WL1 to WLn is selected, one page among the selected strings may be selected.

Figure 7:
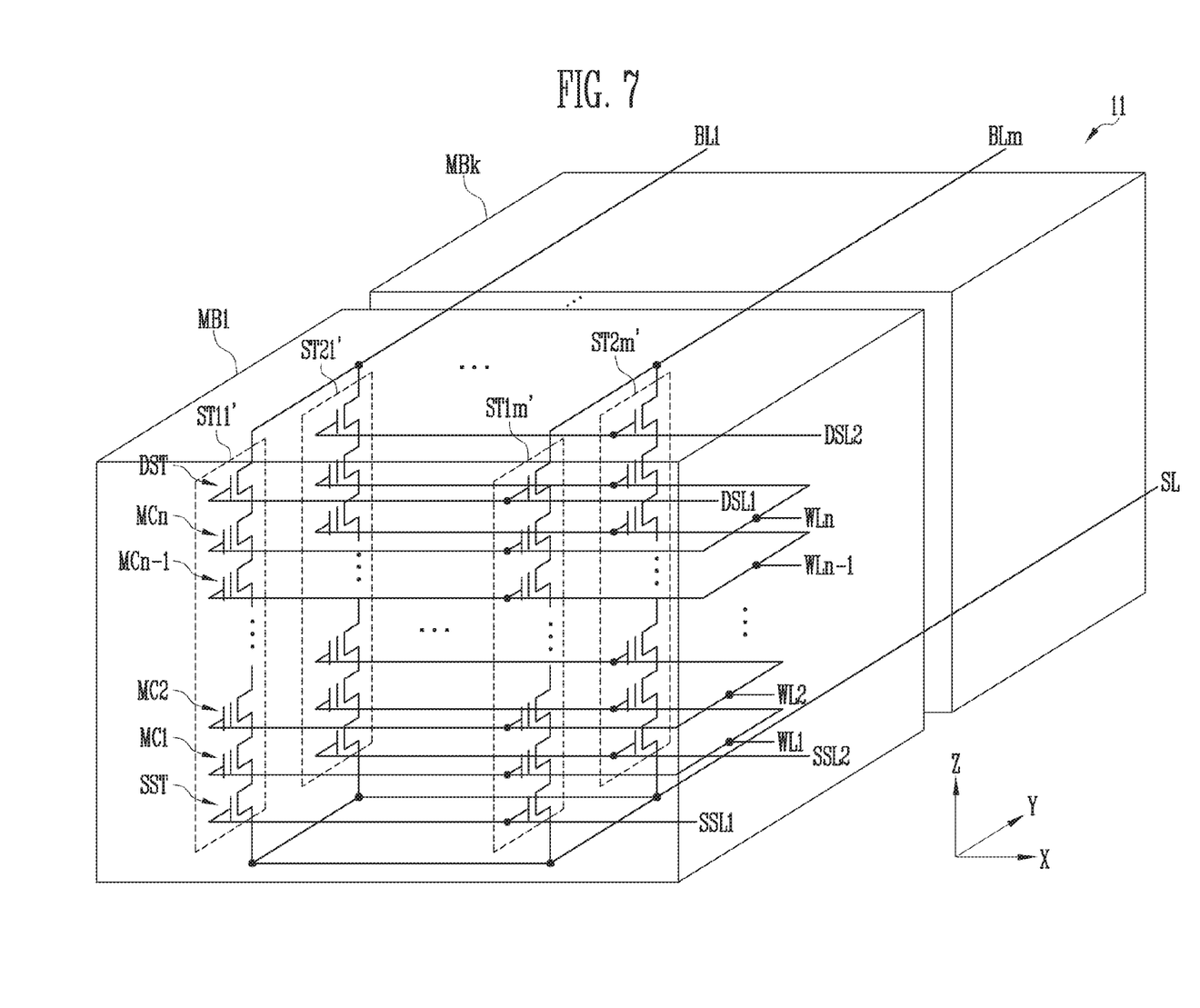
FIG. 7 is a diagram illustrating another embodiment of a three-dimensionally configured memory block.

FIG. 7 is a diagram illustrating another embodiment of the three-dimensionally configured memory block.

Referring to FIG. 7, the memory cell array 10 may include a plurality of memory blocks MB1 to MBk 11. The memory block 11 may include a plurality of strings ST11' to ST1m' and ST21' to ST2m'. Each of the plurality of strings ST11' to ST1m' and ST21' to ST2m' may extend along a vertical direction (Z direction). In the memory block 11, m strings may be arranged in a row direction (X direction). Although an arrangement in which two strings are arranged in a column direction (Y direction) is illustrated in FIG. 7, this is for clarity; three or more strings may be arranged in the column direction (Y direction).

Each of the plurality of strings ST11' to ST1m' and ST21' to ST2m' may include at least one source select transistor SST, first to nth memory cells MC1 to MCn, and at least one drain select transistor DST.

The source select transistor SST of each string may be coupled between a source line SL and the memory cells MC1 to MCn. Source select transistors of strings arranged in the same row may be coupled to the same source select line. Source select transistors of strings ST11' to ST1m' arranged on a first row may be coupled to a first source select line SSL1. Source select transistors of strings ST21' to ST2m' arranged on a second row may be coupled to a second source select line SSL2. In another embodiment, the source select transistors of the strings ST11' to ST1m' and ST21' to ST2m' may be commonly coupled to one source select line.

The first to nth memory cells MC1 to MCn of each string may be coupled in series to each other between the source select transistor SST and the drain select transistor DST. Gates of the first to nth memory cells MC1 to MCn may be coupled to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. Accordingly, the reliability of data stored in the memory block 11 can be improved.

The drain select transistor DST of each string may be coupled between a bit line and the memory cells MC1 to MCn. Drain select transistors DST of strings arranged in the row direction may be coupled to a drain select line extending in the row direction. The drain select transistors DST of the strings ST11' to ST1m' of the first row may be coupled to a first drain select line DSL1. The drain select transistors DST of the strings ST21' to ST2m' of the second row may be coupled to a second drain select line DSL2.

Figure 8:
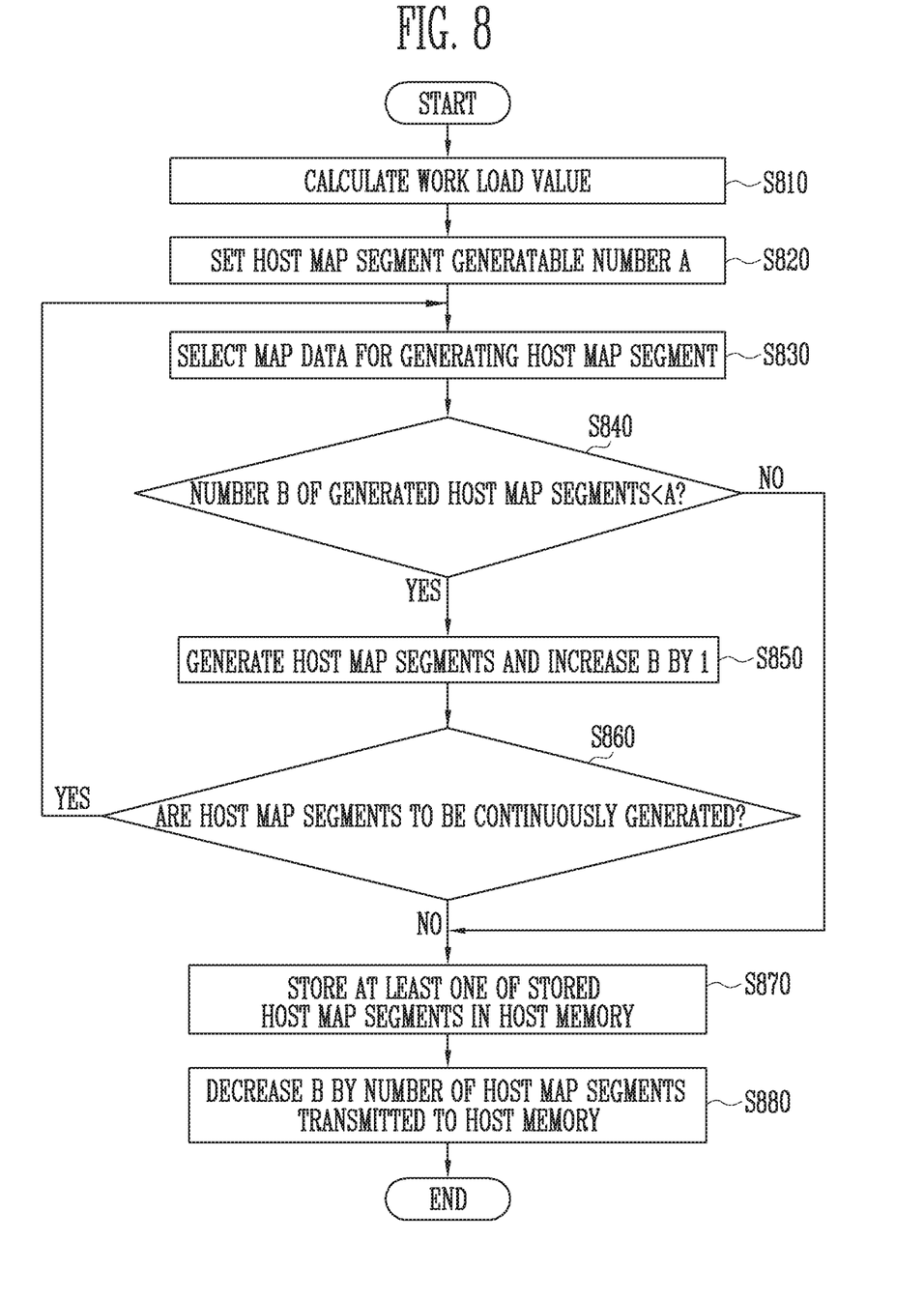
FIG. 8 is a flowchart illustrating an operation of the memory system according to an embodiment of the present disclosure.

FIG. 8 is a flowchart illustrating an operation of the memory system 1000 according to an embodiment of the present disclosure, which is described with additional reference to FIGS. 1-7.

The work load calculation block 1222D generates the work load value WAI_Value by calculating a work load of the memory system during a setting period in which an operation of generating the host map segment HPB_segment and an operation of transmitting the generated host map segment HPB_segment to the host and the memory device are performed (S810). For example, the work load calculation block 1222D calculates a work load value by predicting an operation of generating a host map segment, a write, read or erase operation of the memory system and an operation of storing the host map segment in the memory device 1100, which are to be performed in the setting period.

The segment number setting block 12221 sets a generatable number of host map segments (generatable number A), based on the work load value WAI_Value (S820). For example, the segment number setting block 12221 sets the generatable number A by decreasing it when the calculated work load value WAI_Value of the memory system 1000 increases, and increasing the generatable number A when the calculated work load value WAI_Value of the memory system 1000 decreases.

The host map segment generation block 1222A selects some map data among map data stored in the map data storage block 1231 shown in FIG. 2 or the memory device 1100 shown in FIG. 1 (S830). As for a selection criterion, map data accessed a large number of times by an address received from the host 1300 among the map data stored in the map data storage block 1231 or the memory device 1100 may be selected. That is, map data having a high access frequency may be selected among plural pieces of map data.

The segment number setting block 12221 compares the generatable number A with a number B of generated host map segments HPB_segment, which is managed by the counter block 1222B (S840).

As the result of the above-described comparison step S840, when it is determined that the number B is less than the generatable number A (Yes), the host map segment generation block 1222A generates host map segments HPB_segment based on the selected map data in response to a start signal Start, and the counter block 1222B increases the number B of generated host map segments by 1 (S850). The generated host map segments HPB_segment are stored in the host map segment storage block 1232 or the system block of the semiconductor memory 100.

Subsequently, it is determined whether host map segments are to be continuously generated (S860). For example, when the increased number B is less than the generatable number A, it may be determined that the host map segments are to be continuously generated.

When it is determined that the host map segments are to be continuously generated (S860, Yes), the above-described steps are re-performed from the step S830.

On the other hand, when it is determined that the host map segments are not to be continuously generated (S860, No), at least one host map segment among a plurality of host map segments stored in the host map segment storage block 1232 or the system block of the semiconductor memory 100 is transmitted to the host 1300 to be stored in the host memory 1320 (S870). The host map segment stored in the host memory 1320 may be removed in the host map segment storage block 1232 or the system block of the semiconductor memory 100.

Returning to the comparison step S840, when it is determined that the number B of generated host map segments is greater than or equal to generatable number A (S840, No), the following steps are performed after the above-described step S870 is performed.

After the step S870, the counter block 1222B subtracts from the number B a number of host map segments transmitted from the host map segment storage block 1232 or the system block of the semiconductor memory 100 to the host 1300 to be stored in the host memory 1320 (S880).

As described above, according to embodiments of the present disclosure, the number of host map segments generated is adjusted or controlled based on the work load value of the memory system, so that the efficiency of the memory system can be improved.

Figure 9:
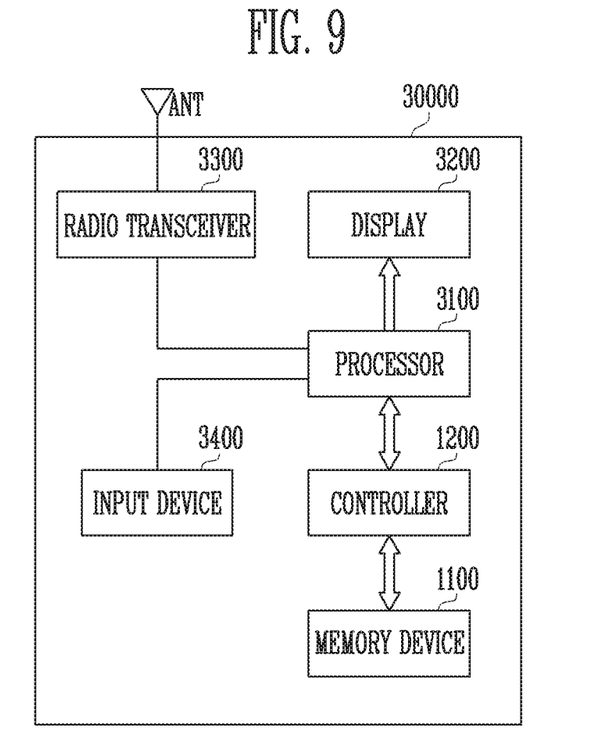
FIG. 9 is a diagram illustrating an embodiment of the memory system.

FIG. 9 is a diagram illustrating an embodiment of the memory system.

Referring to FIG. 9, the memory system 30000 may be implemented as a cellular phone, a smart phone, a tablet PC, a personal digital assistant (PDA), or a wireless communication device. The memory system 30000 may include a memory device 1100 and a controller 1200 capable of controlling an operation of the memory device 1100. The controller 1200 may control a data access operation of the memory device 1100, e.g., a program operation, an erase operation, a read operation, or the like under the control of a processor 3100.

Data programmed in the memory device 1100 may be output through a display 3200 under the control of the controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the controller 1200 or the display 3200. The controller 1200 may transmit the signal processed by the processor 3100 to the memory device 1100. Also, the radio transceiver 3300 may convert a signal output from the processor 3100 into a radio signal, and output the changed radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the controller 1200, data output from the radio transceiver 3300, or data output from the input device 3400 can be output through the display 3200.

In some embodiments, the controller 1200 capable of controlling an operation of the memory device 1100 may be implemented as a part of the processor 3100, or be implemented as a chip separate from the processor 3100. Also, the controller 1200 may be implemented with the controller shown in FIG. 2.

Figure 10:
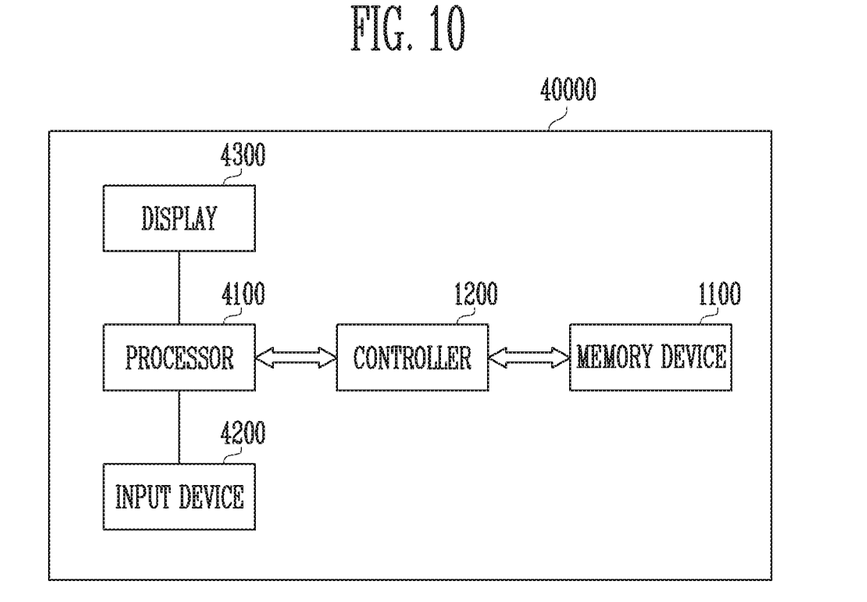
FIG. 10 is a diagram illustrating an embodiment of the memory system.

FIG. 10 is a diagram illustrating an embodiment of the memory system.

Referring to FIG. 10, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 and a controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the controller 1200. In some embodiments, the controller 1200 capable of controlling an operation of the memory device 1100 may be implemented as a part of the processor 4100, or be implemented as a chip separate from the processor 4100. Also, the controller 1200 may be implemented with the controller shown in FIG. 2.

Figure 11:
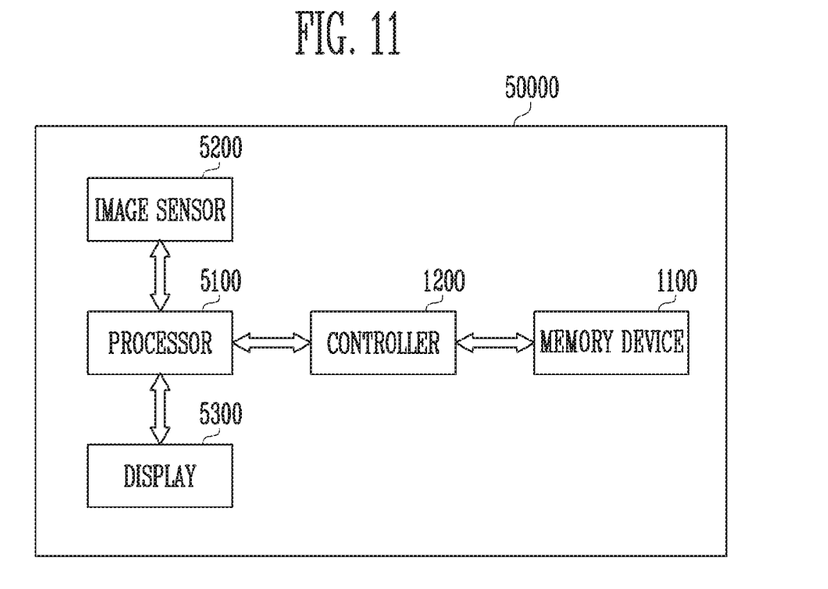
FIG. 11 is a diagram illustrating an embodiment of the memory system.

FIG. 11 is a diagram illustrating an embodiment of the memory system.

Referring to FIG. 11, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the memory device 1100 through the controller 1200. In addition, data stored in the memory device 1100 may be output through the display 5300 under the control of the processor 5100 or the controller 1200.

In some embodiments, the controller 1200 capable of controlling an operation of the memory device 1100 may be implemented as a part of the processor 5100, or be implemented as a chip separate from the processor 5100. Also, the controller 1200 may be implemented with the controller shown in FIG. 2.

Figure 12:
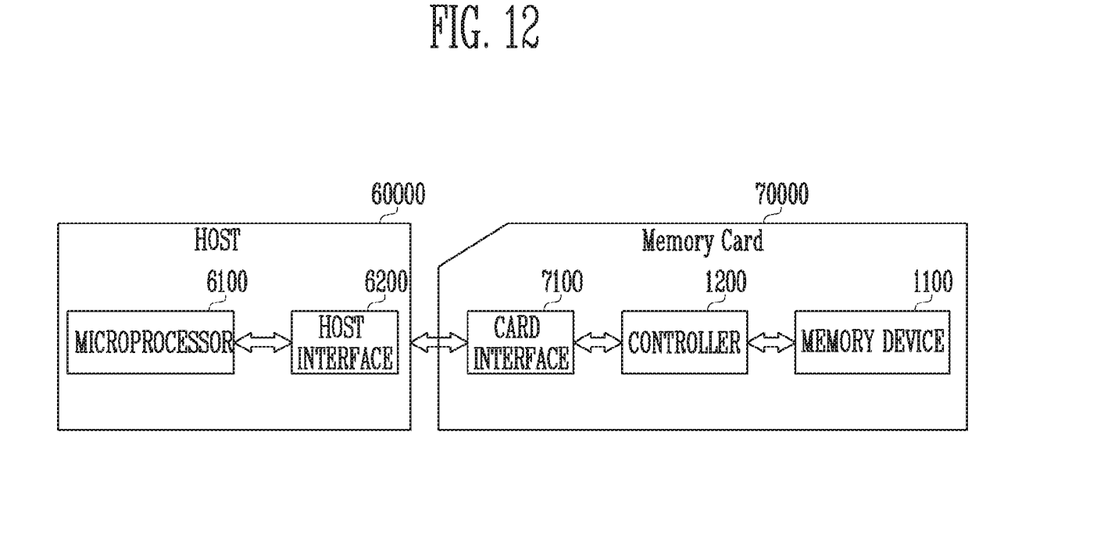
FIG. 12 is a diagram illustrating an embodiment of the memory system.

FIG. 12 is a diagram illustrating an embodiment of the memory system.

Referring to FIG. 12, the memory system 70000 may be implemented as a memory card or a smart card. The memory system 70000 may include a memory device 1100, a controller 1200, and a card interface 7100.

The controller 1200 may control data exchange between the memory device 1100 and the card interface 7100. In some embodiments, the card interface 7100 may be a secure digital (SD) card interface or a multi-media card (MMC) interface, but the present disclosure is not limited thereto. Also, the controller 1200 may be implemented with the controller shown in FIG. 2.

The card interface 7100 may interface data exchange between a host 60000 and the controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the controller 1200 under the control of a microprocessor 6100.

According to embodiments of the present disclosure, the number of host map segments generated based on a workload of the memory system is adjusted, so that the efficiency of an operation of storing a host map segment can be improved.

While the present invention has been shown and described with reference to various embodiments thereof, it will be understood by those skilled in the art in light of the present disclosure that various changes in form and details may be made therein without departing from the spirit and scope of the present invention as defined by the appended claims and their equivalents. Therefore, the scope of the present invention should not be limited to the above-described embodiments but should be determined by the appended claims and equivalents thereof.

In the above-described embodiments, steps may be selectively performed or parts of steps may be omitted. Moreover, the steps are not necessarily performed in accordance with the described order and may be rearranged. The embodiments disclosed herein are provided to facilitate an understanding of the present invention, not to limit it. That is, it should be apparent to those skilled in the art that various modifications can be made on the basis of the technological scope of the present disclosure.

Although specific terminologies are used here, they are only to explain the embodiments, not to limit the present invention. Therefore, the present invention is not restricted to the above-described embodiments, as many variations are possible within the spirit and scope of the present disclosure. The present invention encompasses not only the disclosed embodiments but all modifications and variations thereof that fall within the scope of the present disclosure.

What is claimed is:

1. A memory system comprising:
    a memory device including a system block for storing map data for mapping a logical address to a physical address, the memory device performing overall operations in response to an internal command;
    a host configured to receive and store a host map segment including a portion of the map data; and
    a controller configured to generate the internal command for controlling the memory device in response to a host command received from the host,
    wherein the controller receives the map data from the memory device and then stores the received map data, and generates the host map segment, using the map data, and then transmits the generated host map segment, wherein a number of generatable host map segments is adjusted based on a work load calculated in a setting period, and
    wherein the work load indicates an amount of data to be processed among an operation of generating the host map segment, a write, read or erase operation of the memory system and an operation of storing the host map segment in the memory device.

2. The memory system of claim 1, wherein the controller decreases the number of generatable host map segments when the work load calculated in the setting period increases, and increases the number of generatable host map segments when the work load calculated in the setting period decreases.

3. The memory system of claim 1, wherein the controller stores the generated host map segment in the controller or in the system block of the memory device, or in both the controller and the system block.

4. The memory system of claim 1, wherein the setting period is a period in which the operation of generating the host map segment and an operation of transmitting the generated host map segment to the host and the memory device are performed.

5. The memory system of claim 1, wherein the controller generates the host map segment by selecting map data having a greater access frequency among the map data stored in the controller and the map data stored in the system block.

6. The memory system of claim 1, wherein the controller includes:
    a processor configured to map an address received from the host, based on the map data, and generate the host map segment, based on the map data; and
    a buffer memory configured to store the map data and the host map segment.

7. The memory system of claim 6, wherein the processor includes:
    a flash translation layer configured to map the address based on the map data; and
    a Host-aware Performance Booster (HPB) control block configured to generate the host map segment by selecting some map data among the map data stored in the buffer memory and the map data stored in the system block, wherein the number of generatable host map segments is adjusted by calculating the work load of the memory system.

8. The memory system of claim 7, wherein the HPB control block includes:
    a host map segment generation block configured to generate the host map segment, based on the some map data, in response to a start signal, and stop the operation of generating the host map segment in response to a stop signal;
    a counter block configured to increment the number of generated host map segments whenever another host map segment, among the generatable host map segments, is generated in the host map segment generation block, and, when the host map segment is transmitted to the host, manage the number of generated host map segments by decreasing the number of generated host map segments by a number of host map segments transmitted to the host;
    a work load calculation block configured to calculate the work load during the setting period; and
    a segment generation control block configured to set a generatable number, representing the number of generatable host map segments, based on the calculated work load, and generate the start signal or the stop signal by comparing the number of generated host map segments with the generatable number.

9. The memory system of claim 8, wherein the HPB control block:
    when the number of generated host map segments is less than the generatable number, generates another host map segment; and
    when the number of generated host map segments is greater than or equal to the generatable number, stops the operation of generating host map segments.

10. A memory system comprising:
- a memory device including a system block for storing map data for mapping a logical address to a physical address and a host map segment including a portion of the map data; and
- a controller configured to control overall operations of the memory device, receive and store some map data among the map data stored in the system block, and generate the host map segment, based on the map data or the some map data,
- wherein the controller adjusts a number of generatable host map segments based on a work load calculated in a setting period,
- wherein the work load indicates an amount of data to be processed among an operation of generating the host map segment, a write, read or erase operation of the memory system and an operation of storing the host map segment in the memory device.

11. The memory system of claim 10, wherein the controller stores the host map segment in the controller or in the system block of the memory device, and outputs the stored host map segment to a host.

12. The memory system of claim 11, wherein the setting period is a period in which the operation of generating the host map segment and an operation of transmitting the generated host map segment to the host and the memory device are performed.

13. The memory system of claim 10, wherein the controller decreases the number of generatable host map segments when the work load increases, and increases the number of generatable host map segments when the work load decreases.

14. The memory system of claim 10, wherein the controller includes:
- a buffer memory configured to store the some map data and the host map segment; and
- a processor configured to generate the host map segment, based on the map data stored in the system block or the some map data stored on the buffer memory.

15. The memory system of claim 14, wherein the processor includes:
- a flash translation layer configured to map an address received from the host based on the some map data; and
- a Host-aware Performance Booster (HPB) control block configured to generate the host map segment by selecting some map data among the some map data stored in the buffer memory and the map data stored in the system block.

16. The memory system of claim 15, wherein the HPB control block includes:
- a host map segment generation block configured to generate the host map segment based on the some map data, in response to a start signal, and stop the operation of generating the host map segment in response to a stop signal;
- a counter block configured to increment the number of generated host map segments whenever another host map segment, among the generatable host map segments, is generated in the host map segment generation block, and, when the host map segment is transmitted to the host, manage the number of generated host map segments by decreasing the number of generated host map segments by a number of host map segments transmitted to the host;
- a work load calculation block configured to calculate the work load during the setting period; and
- a segment generation control block configured to set a generatable number, representing the generatable number of host map segments, based on the calculated work load, and generate the start signal or the stop signal by comparing the number of generated host map segments with the generatable number.

17. A method for operating a memory system, the method comprising:
- calculating a work load of the memory system;
- generating a host map segment based on map data for mapping a logical address to a physical address stored in a memory device or a controller, wherein a number of generatable host map segments is adjusted based on the calculated work load; and
- outputting the generated host map segment to a host,
- wherein the host map segment includes a portion of the map data, and
- wherein the work load indicates an amount of data to be performed among an operation of generating a host map segment, a write, read or erase operation of the memory system and an operation of storing the host map segment in the memory device.

18. The method of claim 17, wherein the work load is calculated during a setting period, and
- the setting period includes the operation of generating the host map segment, an operation of transmitting the generated host map segment to the host, and an operation of transmitting the host map segment to the memory device.

19. The method of claim 17, wherein the adjusting of the number of generatable host map segments includes:
- incrementing the number of generated host map segments whenever another host map segment is generated;
- setting a generatable number, representing the number of generatable host map segments, based on the calculated work load; and
- continuously performing the operation of generating host map segments when the number of generated host map segments is less than the generatable number, and stopping the operation of generating host map segments when the number of generated host map segments is greater than or equal to the generatable number.

20. The method of claim 19, wherein, when the generated host map segment is transmitted to the host, the number of generated host map segments is decreased by a number of host map segments transmitted to the host.

* * * * *